(12) United States Patent
Suzuki

(10) Patent No.: US 11,687,902 B2
(45) Date of Patent: *Jun. 27, 2023

(54) TAG READING DEVICE

(71) Applicant: TOSHIBA TEC KABUSHIKI KAISHA, Tokyo (JP)

(72) Inventor: Shigeaki Suzuki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 17/082,737

(22) Filed: Oct. 28, 2020

(65) Prior Publication Data

US 2021/0264399 A1 Aug. 26, 2021

(30) Foreign Application Priority Data

Feb. 25, 2020 (JP) ................................. 2020-029099

(51) Int. Cl.
*G06K 9/22* (2006.01)
*G06Q 20/20* (2012.01)
(Continued)

(52) U.S. Cl.
CPC ......... *G06Q 20/208* (2013.01); *G06F 11/073* (2013.01); *G06F 11/0754* (2013.01);
(Continued)

(58) Field of Classification Search
CPC ........................ G06Q 20/208; G06Q 30/0185; G06F 11/073; G06F 11/0754; G06F 11/0772;
(Continued)

(56) References Cited

U.S. PATENT DOCUMENTS

| 11,040,444 B2* | 6/2021 | Cristache | G06K 7/10366 |
| 2010/0060422 A1* | 3/2010 | Van Nest | G06K 7/0008 340/10.1 |

(Continued)

FOREIGN PATENT DOCUMENTS

| FR | 2862406 A1 * | 5/2005 | G06K 7/0008 |
| JP | 2003-030601 A | 1/2003 | |

(Continued)

OTHER PUBLICATIONS

Extended European Search Report issued in European Patent Application No. 20211849.3, dated May 3, 2021, twelve (12) pages.

(Continued)

*Primary Examiner* — Daniel St Cyr
(74) *Attorney, Agent, or Firm* — Foley & Lardner LLP

(57) ABSTRACT

A tag reading device includes an external interface, an RFID interface, a buffer memory, and a processor. The external interface communicates with a higher-level device. The RFID interface reads tag information from an RFID tag. The buffer memory sequentially records the tag information read from the RFID tag using the RFID interface. The processor transmits the tag information recorded in order in the buffer memory to the higher-level device via the external interface, and updates a transmission start pointer indicating untransmitted tag information in the buffer memory.

15 Claims, 5 Drawing Sheets

(51) Int. Cl.
*G06F 11/07* (2006.01)
*G06K 7/10* (2006.01)
*G06K 7/14* (2006.01)
*G06K 19/07* (2006.01)
*G06Q 30/018* (2023.01)

(52) U.S. Cl.
CPC ...... *G06F 11/0772* (2013.01); *G06K 7/10198* (2013.01); *G06K 7/10297* (2013.01); *G06K 7/10861* (2013.01); *G06K 7/1413* (2013.01); *G06K 19/0723* (2013.01); *G06Q 30/0185* (2013.01); *G06K 2007/10504* (2013.01)

(58) Field of Classification Search
CPC ........... G06K 7/10297; G06K 19/0723; G06K 19/07345; G06K 2007/10504; G06K 7/0008; G06K 7/10009; G06K 17/0029; G07G 1/009; G07G 1/0009; G07G 1/12
USPC ................ 714/57; 235/462.46, 380, 492
See application file for complete search history.

(56) References Cited

U.S. PATENT DOCUMENTS

2010/0141405 A1* 6/2010 Iida ...................... G06Q 10/087
340/10.52
2014/0258127 A1* 9/2014 Chava ................ G06Q 20/3276
235/494

FOREIGN PATENT DOCUMENTS

| JP | 2007-065992 A |  | 3/2007 |
| KR | 20080088263 A | * | 10/2008 |
| KR | 10-2011-0029003 A |  | 3/2011 |

OTHER PUBLICATIONS

Final Office Action on U.S. Appl. No. 17/080,191 dated Dec. 23, 2022.

* cited by examiner

| RECORD No | TAG INFORMATION |           |
|-----------|-----------------|-----------|
| 0         | DATA00001       |           |
| 1         | DATA00002       |           |
| 2         | DATA00003       |           |
| 3         | DATA00004       |           |
| 4         | DATA00005       |           |
| 5         | DATA00006       | ← TRANSMISSION START POINTER (SP) |
| 6         | DATA00007       |           |
| 7         | DATA00008       |           |
| 8         | DATA00009       |           |
| 9         | DATA00010       |           |
| 10        | DATA00011       |           |
| 11        |                 | ← WRITE POINTER (WP) |
| 12        |                 |           |
| ...       | ...             |           |
| 197       |                 |           |
| 198       |                 |           |
| 199       |                 |           |

TAG READING DEVICE

CROSS-REFERENCE TO RELATED APPLICATION

This application claims the benefit of and priority to Japanese Patent Application No. 2020-029099, filed on Feb. 25, 2020, the entire contents of which are incorporated herein by reference.

TECHNICAL FIELD

Embodiments described herein relate generally to a tag reading device.

BACKGROUND

A tag reading system collectively reads a plurality of RFID tags (hereinafter, also referred to as wireless tags). For example, there is a point of sales (POS) system in which a tag reading device collectively reads an RFID tag attached to a commodity to be purchased by a customer to perform commodity registration processing. In such a POS system, an RFID tag attached to a commodity to be purchased is read by a tag reading device.

However, in a POS system, it may happen that the RFID tags attached to all the commodities to be purchased cannot be read in actual operation. If the desired RFID tag was not read, the tag reading system re-executes the RFID tag reading process by the tag reading device. A tag reading device outputs all the information read from each RFID tag to a higher-level device each time the reading process is executed, even with the same RFID tag. Therefore, in the tag reading system, the higher-level device has to carefully examine the information read from the RFID tag by using the tag reading device to execute the duplicate check.

DESCRIPTION OF THE DRAWINGS

FIG. 3 is a diagram showing a configuration of a buffer memory that stores tag information read from an RFID tag by the tag reading device, according to an example embodiment;

DETAILED DESCRIPTION

In order to solve the above problems, a tag reading device capable of outputting information is provided. The tag reading device can reduce the processing in a higher-level device.

In general, according to at least one embodiment, a tag reading device includes an external interface, an RFID interface, a buffer memory, and a processor. The external interface communicates with a higher-level device. The RFID interface reads tag information from an RFID tag. The buffer memory sequentially records the tag information read from the RFID tag using the RFID interface. The processor transmits the tag information recorded in order in the buffer memory to the higher-level device via the external interface and updates a transmission start pointer indicating untransmitted tag information in the buffer memory.

Embodiments will be described below with reference to the drawings.

A tag reading system according to at least one embodiment is a system including a tag reading device that reads an RFID tag (e.g., a wireless tag) and a higher-level device. The RFID tag is attached to an article, such as a commodity or a part, and stores tag information including information specifying the article. The RFID tag is activated by radio waves from the tag reading device and outputs the tag information. In the present embodiment, as an example, it is assumed that the RFID tag is a tag attached to each commodity sold in the store and stores information indicating the commodity.

The tag reading device reads the tag information from each RFID tag within the communication range by wireless communication. If a plurality of RFID tags exist in the communication range, the tag reading device will read a plurality of tag information. For example, the tag reading system may be a system that reads an RFID tag attached to a commodity that a customer intends to purchase, or a system that reads an RFID tag attached to an article existing in a warehouse or a shelf. The tag reading device may be a device that reads an RFID tag that is installed at a predetermined position and that exists in a predetermined communication range, or may be a handheld device that is operated by an operator holding the tag reading device in a hand.

Hereinafter, a POS system 1 as a tag reading system including the tag reading device will be described, according to an example embodiment.

Figure 1:
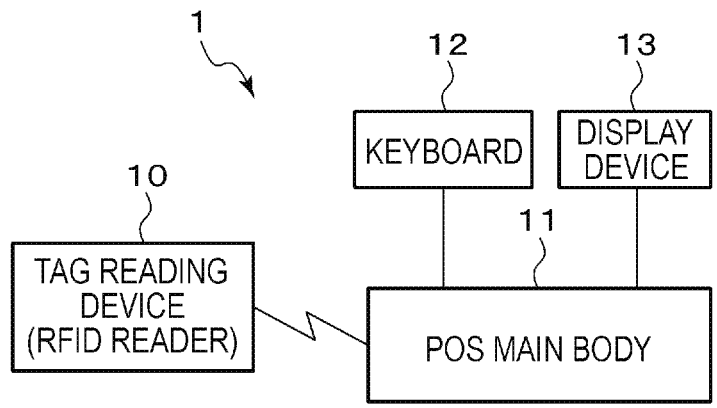
FIG. 1 is a block diagram schematically showing a configuration of a POS system as a tag reading system including a tag reading device, according to an example embodiment.

FIG. 1 is a block diagram schematically showing a configuration of a POS system as a tag reading system including a tag reading device according to at least one embodiment.

The POS system 1 includes a tag reading device (tag reader) 10 and a POS main body 11. The POS main body 11 is arranged in a checkout lane of the store in a state where a keyboard 12 and a display device 13 are connected thereto in addition to the tag reading device 10. For example, the counter provided in the checkout lane is provided with a reading area on which the commodity to be purchased is placed. The customer who purchases the commodity places the commodity in the reading area. The commodity is attached with an RFID tag. The commodity to which the RFID tag is attached may be placed directly in the reading area or may be set in the reading area while being housed in a commodity storage unit such as a shopping basket or a bag.

The tag reading device 10 reads an RFID tag attached to a commodity that a customer purchases in the checkout lane of the store. The tag reading device 10 is arranged to read data from an RFID tag attached to a commodity in the reading area by wireless communication in a non-contact manner. The tag reading device 10 outputs information read from the RFID tag to the point of sales (POS) main body 11 as the higher-level device.

The POS main body 11 registers the information of the commodity to be purchased by the customer based on the reading result of the RFID tag acquired from the tag reading device 10. The POS main body 11 specifies the commodity to be purchased based on the RFID tag data read by the tag reading device 10. The POS main body 11 identifies the commodity specified based on the data of the RFID tag as a purchased commodity and generates sales data of the purchased commodity. The POS main body 11 registers the generated sales data of the purchased commodities and calculates the total price of the purchased commodities. The POS main body 11 executes a settlement process for the calculated total amount of purchased commodities.

The POS main body 11 may be connected to a barcode reader (BCR) that reads a barcode that includes information specifying a commodity described in a commodity package or the like. Here, the POS main body 11 may read the barcode described on the package of the commodity by the barcode reader (BCR) to add the commodity to be purchased. The POS main body 11 may add a commodity to be purchased based on information input using the keyboard 12 or the display device 13 (for example, a display device with a touch panel).

The POS main body 11 includes an interface for connecting the tag reading device 10, the keyboard 12, the display device 13, or the BCR. Here, the interface for the POS main body 11 to connect the tag reading device 10 can be configured with the same configuration as the interface for connecting the BCR. That is, the tag reading device 10 according to the present embodiment can be connected to the BCR interface included in the POS main body 11 and may be connected to the POS main body 11 instead of the BCR.

Figure 2:
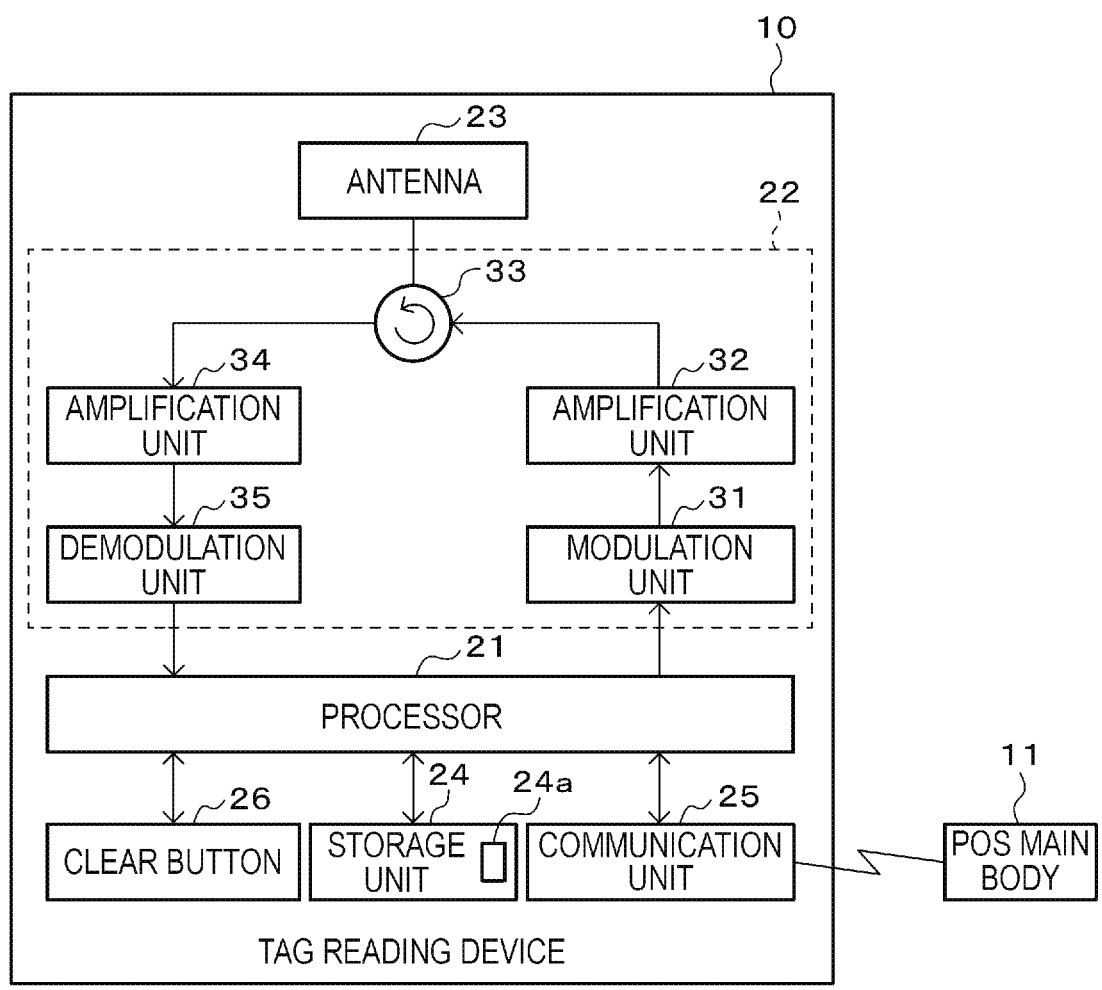
FIG. 2 is a block diagram showing a configuration of a control system in the tag reading device, according to an example embodiment.

Next, the configuration of the tag reading device 10 according to the example embodiment will be described. FIG. 2 is a block diagram showing a configuration of a control system in the tag reading device 10 according to the example embodiment. As shown in FIG. 2, the tag reading device 10 includes a processor 21, a communication control circuit 22, an antenna 23, a storage unit 24, a communication unit 25 (e.g., a communicator), and a clear button 26.

The processor 21 controls each unit. The processor 21 is configured to control each unit and various data processing by executing programs. The processor 21 is a control unit including an arithmetic circuit such as a CPU, and an internal memory. The processor 21 executes various processes by executing the program stored in the internal memory or the storage unit 24. For example, the processor 21 executes processing according to a command from the higher-level device (POS main body 11) received by the communication unit 25.

The communication control circuit 22 and the antenna 23 form an RFID interface for reading an RFID tag. The communication control circuit 22 includes a control circuit for communicating with the RFID tag via the antenna 23. The communication control circuit 22 causes the antenna 23 to transmit a radio wave including transmission data supplied from the processor 21. Therefore, the communication control circuit 22 outputs the radio wave, via the antenna 23, which can be received by the RFID tag at the reading area. The communication control circuit 22 supplies a signal of received data received by the antenna 23 to the processor 21. That is, the communication control circuit 22 acquires the signal received by the antenna 23 from the RFID tag and supplies the information included in the signal received from the RFID tag to the processor 21.

In the configuration example shown in FIG. 2, the communication control circuit 22 includes a modulation unit 31 (e.g., a modulator), a transmission side amplification unit 32 (e.g., an amplifier), a directional coupler 33, a reception side amplification unit 34 (e.g., an amplifier), a demodulation unit 35 (e.g., a demodulator), and the like. The modulation unit 31 modulates the carrier wave with the transmission data provided by the processor 21. The transmission side amplification unit 32 amplifies the output signal of the modulation unit 31. The directional coupler 33 supplies the output signal of the transmission side amplification unit 32 to the antenna 23. As a result, the communication control circuit 22 outputs the carrier wave modulated with the transmission data from the antenna 23.

The RFID tag receives the radio wave transmitted from the antenna 23. The RFID tag recognizes a read command included in the signal received from the antenna 23. When the RFID tag recognizes the read command, the RFID tag outputs the data (e.g., tag information) stored in its own memory, for example, by backscatter modulation, in radio waves.

The antenna 23 receives the radio wave output from the RFID tag. The directional coupler 33 acquires the received signal received by the antenna 23 and supplies the acquired received signal to the reception side amplification unit 34. The reception side amplification unit 34 amplifies the received signal of the antenna 23. The demodulation unit 35 demodulates a data signal from the signal amplified by the reception side amplification unit 34.

The antenna 23 may be any antenna configured to transmit and receive radio waves. That is, the antenna 23 may be any antenna that transmits a signal to be supplied to the RFID tag and receives a radio wave output from the RFID tag. In the present embodiment, the antenna 23 is arranged to transmit electromagnetic waves toward the reading area. The tag reading device 10 is configured to communicate with the RFID tags attached to all the commodities arranged in the reading area via the antenna 23. The antenna 23 is, for example, a planar antenna. However, the antenna 23 is not limited to a particular configuration.

The communication unit 25 is an external interface for communicating with an external device. The communication unit 25 communicates with the POS main body 11 as the higher-level device. The communication unit 25 may be an interface for connecting to the POS main body 11 and may be a wired interface or a wireless interface.

The storage unit 24 stores data. The storage unit 24 may be any storage unit configured with a memory that stores rewritable data is included. For example, the storage unit 24 may be configured to include various memories such as RAM, ROM, and NVM. In the present embodiment, the storage unit 24 includes a buffer memory 24a that stores the tag information read from the RFID tag. The clear button 26 is a button for instructing to clear the tag information accumulated in the buffer memory 24a.

Next, the configuration of the buffer memory 24a provided in the storage unit 24 of the tag reading device 10 will be described. FIG. 3 is a diagram showing a configuration example of the buffer memory 24a provided in the storage unit 24 of the tag reading device 10 according to the example embodiment. As shown in FIG. 3, the buffer memory 24a is provided with a plurality of record areas for storing tag information read from individual RFID tags. The size of the buffer memory 24a (e.g., the number of record areas) can be set as appropriate.

In the buffer memory 24a, the tag information is sequentially stored in each record area to set various pointers. In the configuration example shown in FIG. 3, a transmission start pointer SP and an ID write pointer WP are set in the record area of the buffer memory 24a. The transmission start pointer SP is a pointer indicating tag information (record area) for starting transmission. The write pointer WP is a pointer indicating a record area in which tag information is written. For example, the processor 21 refers to the write pointer to determine the record area in which the tag information read from the RFID tag is stored. When outputting the read tag information to the POS main body 11 as the higher-level device, the processor 21 outputs the tag information stored in each record area in order of the record area indicated by the transmission start pointer.

The buffer memory 24a may be configured as a ring buffer in which a predetermined number of record areas are set. When the buffer memory 24a serving as the ring buffer becomes full due to the tag information read from many RFID tags, the tag information newly read is sequentially overwritten from the oldest record area.

The buffer memory 24a may be configured so that the size (e.g., the number of record areas) can be changed. Here, the buffer memory 24a may secure a new record area and store the read tag information when the buffer becomes full or when a predetermined threshold before the buffer full is exceeded.

Figure 4:
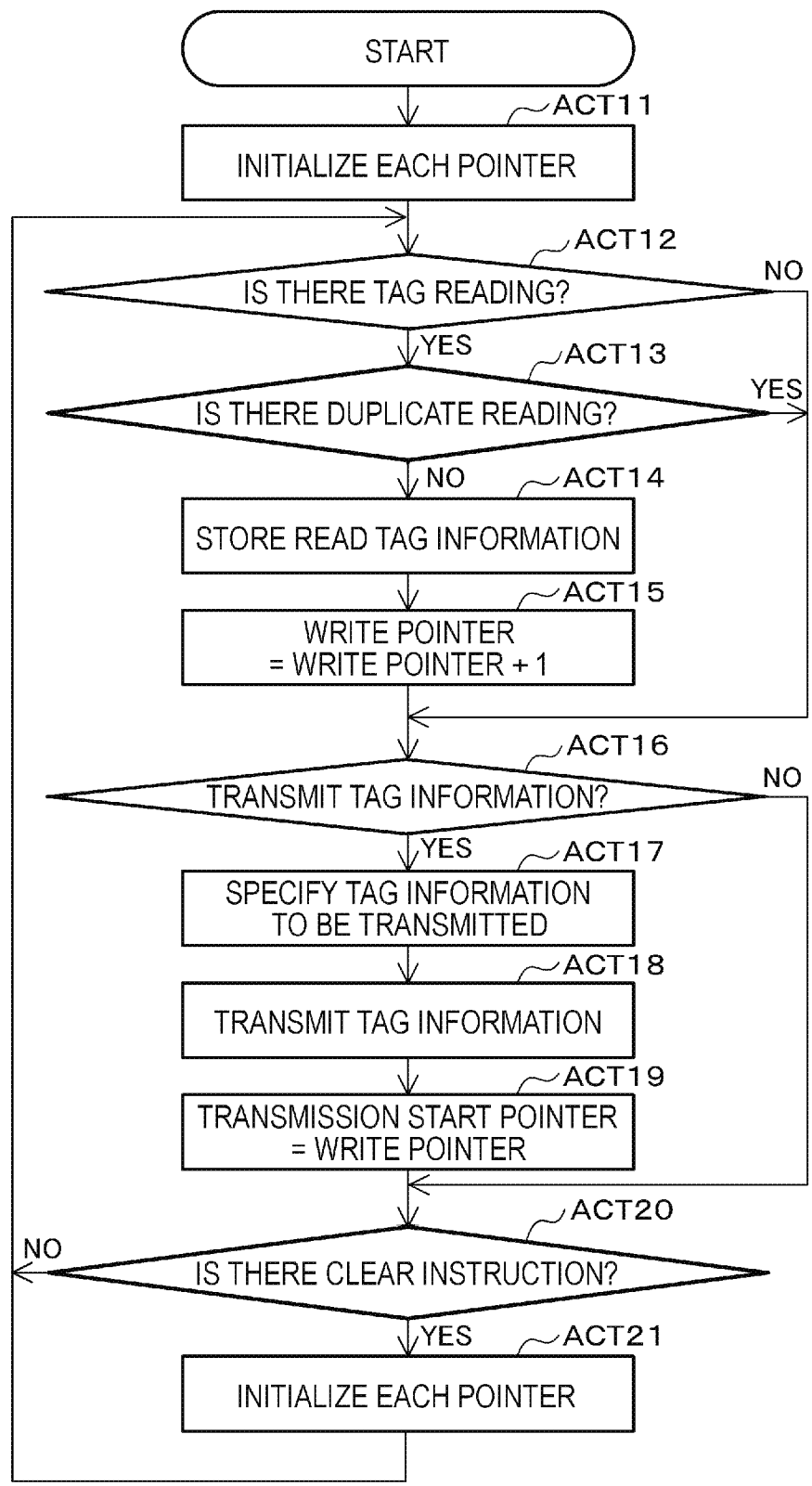
FIG. 4 is a flowchart for illustrating a first operation of the tag reading device, according to an example embodiment.

Next, the operation of the tag reading device 10 according to the embodiment will be described. FIG. 4 is a flowchart for illustrating a first operation example of the tag reading device 10 according to the example embodiment. The processor 21 of the tag reading device 10 starts the RFID tag reading process in response to a request from the POS main body 11 connected via the communication unit 25. When starting the reading of the RFID tag, the processor 21 secures the buffer memory 24a and initializes the write pointer WP and the transmission start pointer SP (ACT 11). For example, the processor 21 sets the write pointer WP to the initial value (WP=0) and sets the transmission start pointer SP to the initial value (SP=0).

The processor 21 uses the communication control circuit 22 to transmit a signal indicating a read command from the antenna 23 as a radio wave. For example, the communication control circuit 22 generates a modulated signal obtained by the modulation unit 31 modulating the carrier wave with a read command. The modulated signal is amplified by the transmission side amplification unit 32 and then supplied to the antenna 23 via the directional coupler 33. As a result, the antenna 23 transmits a radio wave indicating the read command.

The antenna 23 is configured to transmit radio waves to the reading area. Therefore, the RFID tag existing in the reading area receives the radio wave from the antenna 23 and is activated to recognize the read command. The RFID tag that recognized the read command transmits a response signal including the tag information stored in its own memory by, for example, backscatter modulation.

When the antenna 23 receives the response signal indicating the tag information from the RFID tag, the signal received by the antenna 23 is supplied to the reception side amplification unit 34 via the directional coupler 33. The received signal amplified by the reception side amplification unit 34 is input to the demodulation unit 35 and demodulated into a signal indicating the tag information of the RFID tag. The signal demodulated by the demodulation unit 35 is supplied to the processor 21 as tag information read from the RFID tag.

When the processor 21 acquires the tag information from the RFID tag (e.g., YES in ACT 12), the processor 21 checks whether the acquired tag information is already read tag information (e.g., a duplicate reading) (ACT 13). The processor 21 determines whether duplicate reading is performed depending on whether the same tag information as the acquired tag information is stored in the buffer memory 24a. When it is determined that the duplicate reading is performed (e.g., YES in ACT 13), the processor 21 proceeds to ACT 16 without newly storing the tag information in the buffer memory 24a.

If it is determined that the duplicate reading is not performed (e.g., NO in ACT 13), the processor 21 stores the tag information read from the RFID tag in the record area indicated by the write pointer WP in the buffer memory 24a (at ACT 14). When the tag information is stored in the buffer memory 24a, the processor 21 increments the record area indicated by the write pointer WP (e.g., write pointer=write pointer+1). As a result, the write pointer WP indicates the record area next to the record area that stored the tag information.

The processor 21 determines whether the tag information accumulated in the buffer memory 24a should be transmitted to the POS main body 11 as the higher-level device (at ACT 16). For example, the processor 21 transmits the tag information accumulated in the buffer memory 24a to the POS main body 11 in response to a request from the POS main body 11. If the transmission of the tag information stored in the buffer memory 24a is unnecessary (e.g., NO in ACT 16), the processor 21 proceeds to the process of ACT 20.

When outputting the tag information read from the RFID tag (e.g., YES in ACT 16), the processor 21 specifies the tag information to be transmitted in the buffer memory 24a based on the transmission start pointer SP (at ACT 17). The processor 21 specifies the record area in the buffer memory 24a indicated by the transmission start pointer SP (e.g., record area to start transmission). The processor 21 sets the tag information stored in each record area from the record area where transmission is started to before the record area indicated by the write pointer WP, as the transmission target.

When the tag information to be transmitted is specified, the processor 21 transmits tag information to be transmitted to the POS main body 11 via the communication unit 25 (at ACT 18). After transmitting the tag information, the processor 21 sets the transmission start pointer SP to the same value (e.g., position) as the write pointer WP. As a result, the record area next to the record area from which the tag information is transmitted can be designated as the record area for starting the next transmission.

The processor 21 also monitors the input to the clear button 26 (at ACT 20). Here, the processor 21 may receive an instruction to the clear button 26 at any timing. For example, the operator pushes the clear button 26 when he/she wants to clear the tag information that was already read, or when he/she wants to read the RFID tag again. If there is no input to the clear button 26 (e.g., NO in ACT 20), the processor 21 repeatedly executes the processes of ACTS 12 to 20.

Upon detecting the input to the clear button 26 (e.g., YES in ACT 20), the processor 21 clears each tag information stored in the buffer memory 24a and initializes the write pointer WP and the transmission start pointer SP (at ACT 22). For example, the processor 21 sets the write pointer WP to "0" and sets the next write position to be the first record area in the buffer memory 24a. The processor 21 sets the transmission start pointer SP to "0" and sets the transmission start position to be the first record area in the buffer memory 24a.

According to the first operation example as described above, the tag reading device according to the example embodiment stores the tag information read from the RFID tag in the buffer memory and checks the duplicate reading of a specific RFID tag. The tag reading device sets the pointer in the buffer memory and controls so that the same tag information is not repeatedly transmitted to the high-level device.

Therefore, the tag reading device can prevent the reading result of the duplicate reading of the specific RFID tag from being output to the higher-level device. As a result, the higher-level device does not need to check the reading result of the RFID tag obtained from the tag reading device for a duplicate reading of the RFID tag, and efficient processing can be achieved.

In other words, with respect to the reading result by the tag reading device according to the present embodiment, it is not necessary for the higher-level device to check the duplicate reading. Therefore, the higher-level device can process the reading result by the tag reading device with an application similar to the application that processes the reading result by the barcode reader. For example, when the POS main body is connected to the tag reading device instead of the barcode reader, the POS main body can process the reading result by the tag reading device with an application similar to the application that processes the reading result by the barcode reader.

The tag reading device according to the present embodiment includes the clear button configured to clear the buffer memory that stores the tag information read from the RFID tag. When the clear button is pressed, the tag reading device clears the buffer memory that stores the tag information. As a result, according to the tag reading device according to the example embodiment, the RFID tag reading process can be performed again.

Figure 5:
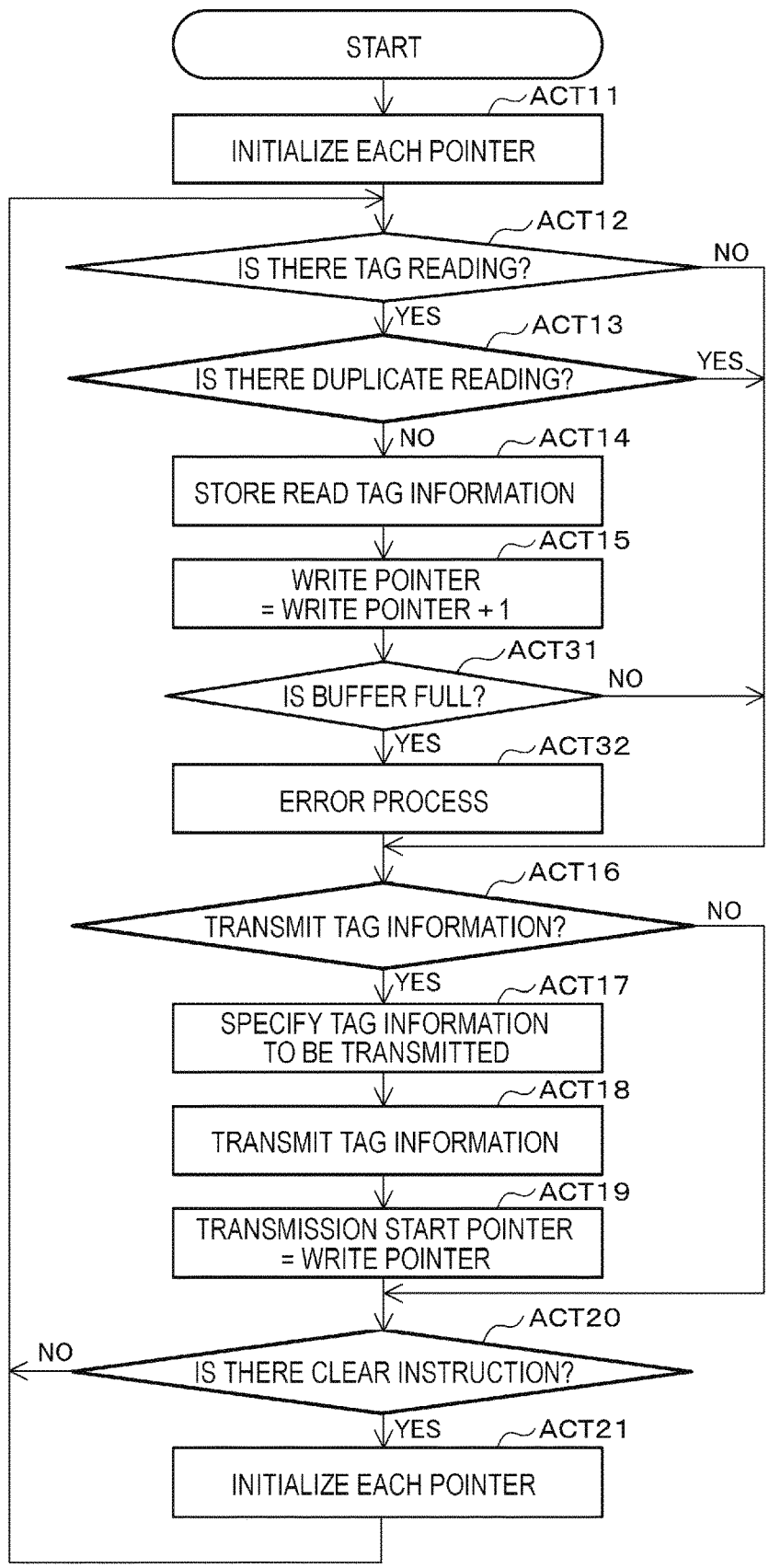
FIG. 5 is a flowchart for illustrating a second operation of the tag reading device, according to an example embodiment.

Next, a second operation example of the tag reading device 10 according to the embodiment will be described. FIG. 5 is a flowchart for illustrating the second operation example of the tag reading device 10 according to the embodiment. The second operation example shown in FIG. 5 is obtained by adding the operations of ACTS 31 and 32 to the first operation example shown in FIG. 4. In other words, in the second operation example shown in FIG. 5, the processes other than ACTS 31 and 32 are the same as the respective processes of the operation shown in FIG. 4, and thus the detailed description thereof will be omitted.

As described above, when the processor 21 of the tag reading device 10 stores the tag information in the buffer memory 24a after checking the duplicate reading, the processor 21 increments the write pointer WP (at ACT 15). When the tag information is stored, the processor 21 checks whether the buffer memory 24a that stores the tag information became a buffer full (at ACT 31). For example, the processor 21 checks whether the buffer is full, depending on whether the incremented write pointer WP exceeds the number of record areas secured in the buffer memory 24a.

When it is determined that the buffer memory 24a became a buffer full (e.g., YES in ACT 31), the processor 21 executes an error process (at ACT 32). As the error process, the processor 21 notifies the POS main body 11 via the communication unit 25 that an error due to a buffer full occurred. The processor 21 may stop the reading operation of the RFID tag as the error process.

The processor 21 may accept a tag information transmission request from the POS main body 11 while stopping the RFID tag reading process as the error process. Here, the processor 21 may execute the process of transmitting the tag information in the buffer memory 24a in response to the transmission request from the POS main body 11 by the same processes as ACTS 16 to 19. After executing the process of transmitting the tag information, the processor 21 may return from the error process and restart the processes from ACT 12.

Alternatively, the processor 21 may receive the input to the clear button 26 while stopping the RFID tag reading process as the error process. Here, if the clear button 26 is pressed, the processor 21 may clear the buffer memory 24a by the same processes as ACTS 20 and 21 and restart the RFID tag reading process from ACT 12.

As described above, in addition to the first operation example described above, the tag reading device according to the second operation example executes the error process when the buffer memory for storing the tag information read from the RFID tag becomes full. As the error process when the buffer becomes full, the tag reading device notifies the higher-level device, such as the POS main body, that the buffer is full, and stops the reading operation of the RFID tag.

Therefore, in the tag reading system, it is possible to recognize in the higher-level device that the reading of the RFID tag stopped because the tag reading device becomes a buffer full. As a result, the higher-level device can restart the reading of the RFID tag by acquiring the tag information as the reading result accumulated in the buffer memory of the tag reading device.

Figure 6:
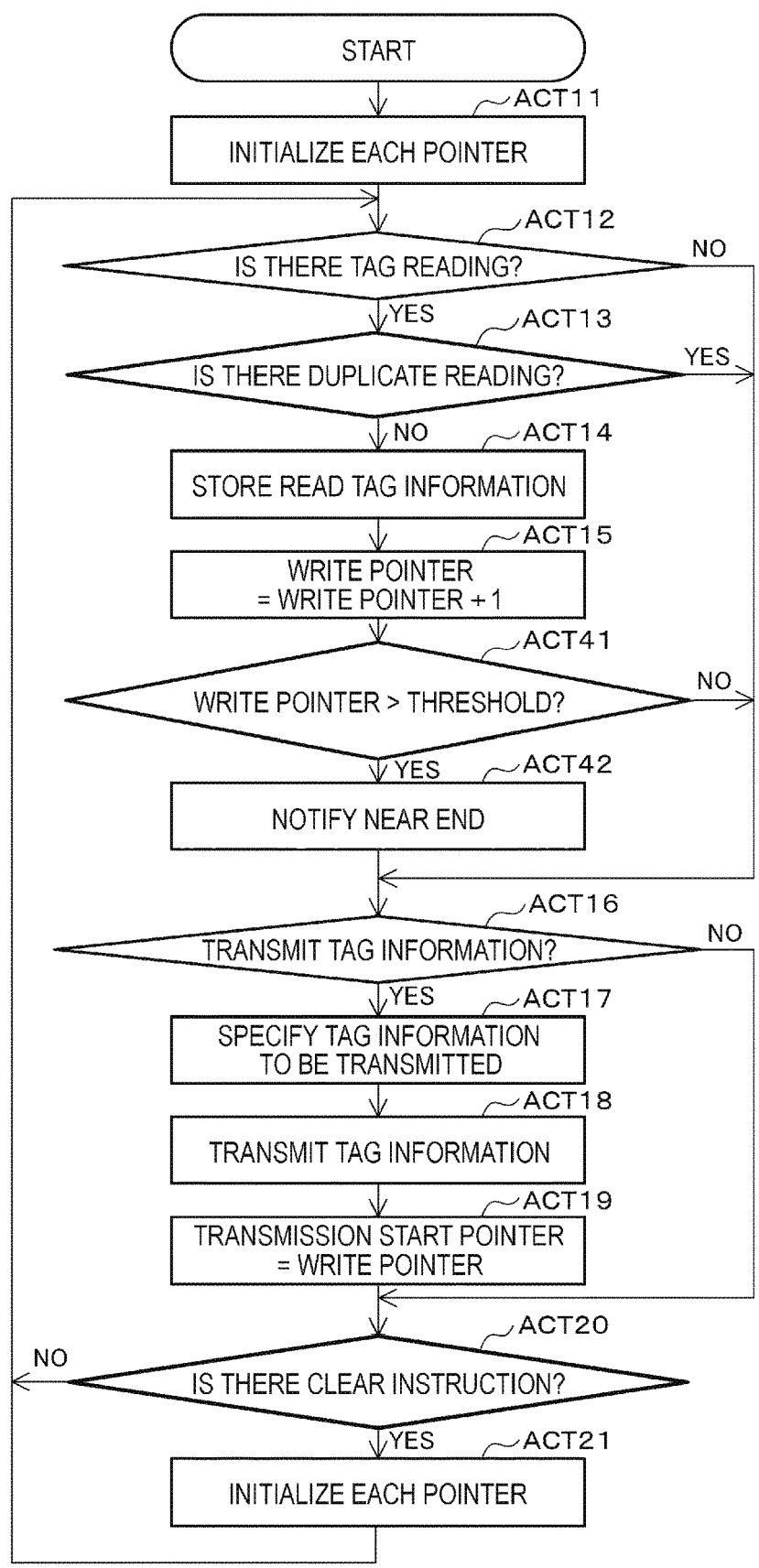
FIG. 6 is a flowchart for illustrating a third operation of the tag reading device, according to an example embodiment.

Next, a third operation example of the tag reading device 10 according to the embodiment will be described. FIG. 6 is a flowchart for illustrating the third operation example with regard to the operation of the tag reading device 10 according to the embodiment. The third operation example shown in FIG. 6 is obtained by adding the operations of ACTS 41 and 42 to the first operation example shown in FIG. 4. Here, in the third operation example as shown in FIG. 6, the processes other than ACTS 41 and 42 are the same as the respective processes of the operation shown in FIG. 4, and thus the detailed description thereof will be omitted.

As described above, when the processor 21 of the tag reading device 10 stores the tag information in the buffer memory 24a after checking the duplicate reading, the processor 21 increments the write pointer WP (at ACT 15). When the tag information is stored in the buffer memory 24a, the processor 21 checks whether the amount of tag information (e.g., a number of pieces of information) stored in the buffer memory 24a exceeds a predetermined threshold (at ACT 41). For example, the processor 21 checks whether the value of the write pointer WP incremented after storing the tag information in the buffer memory 24a exceeds a predetermined threshold.

When it is determined that the amount of tag information stored in the buffer memory 24a exceeds the predetermined threshold (e.g., YES in ACT 41), the processor 21 executes a near-end process (at ACT 42). As the near-end process, the processor 21 notifies the POS main body 11 via the communication unit 25 that the buffer memory 24a is almost full (e.g., near-end). The processor 21 may stop the RFID tag reading process as the near-end process.

The processor 21 may perform guidance for prompting a request for transmission of the tag information from the POS main body 11 while stopping the RFID tag reading process as the near-end process. Here, if there is a transfer request from the POS main body 11, the processor 21 may execute the process of transmitting the tag information in the buffer memory 24a by the same processes as ACTS 16 to 19.

The processor 21 may prompt the input to the clear button 26 while stopping the RFID tag reading process as the near-end process. Here, if the clear button 26 is pressed, the processor 21 clears the buffer memory 24a by the same processes as ACTS 20 and 21 and performs the RFID tag reading process again.

As described above, in addition to the first operation example described above, when the tag information read from the RFID tag and stored in the buffer memory exceeds the threshold, the tag reading device according to the third operation example notifies the higher-level device that the buffer memory is in the near-end state. Therefore, in the tag reading system, the higher-level device can recognize that the buffer memory of the tag reading device is near the buffer full. As a result, in the tag reading system, it is possible to prompt a process such as loading the tag information, as the reading result accumulated in the buffer memory of the tag reading device, into the higher-level device.

In the above-described embodiments, the case where the program executed by the processor is stored in advance in the memory of the device was described. However, the program executed by the processor may be downloaded from the network to the device or may be installed from the storage medium to the device. The storage medium may be a storage medium such as a CD-ROM that can store a program and can be read by the device. The function obtained in advance by installation or download may be achieved in cooperation with an operating system (OS) inside the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tag reading device comprising:
an external interface communicatively coupled to a higher-level device;
a radio frequency identification (RFID) interface configured to read tag information from an RFID tag;
a buffer memory configured to sequentially record the tag information read from the RFID tag via the RFID interface, the buffer memory storing a transmission start pointer indicating tag information for starting transmission and a write pointer indicating a record area in which tag information is written; and
a processor configured to:
transmit the tag information sequentially recorded in the buffer memory to the higher-level device via the external interface;
update the transmission start pointer indicating untransmitted tag information in the buffer memory;
notify the higher-level device of a buffer full error when the buffer memory becomes full; and
stop the reading of the RFID tags when the buffer full error is detected.

2. The device according to claim 1, further comprising:
a clear button configured to clear the tag information recorded in the buffer memory, wherein the processor is further configured to clear the buffer memory in response to an input to the clear button.

3. The device according to claim 1, wherein the buffer memory is a ring buffer.

4. The device according to claim 1, wherein the processor is further configured to notify the higher-level device that the tag information recorded in the buffer memory exceeds a predetermined threshold, wherein the tag information recorded in the buffer memory includes the value of the write pointer.

5. A point of sale (POS) system comprising:
a POS main body configured to:
receive tag information from a radio frequency identification (RFID) tag from a buffer memory; and
identify a commodity based on the tag information; and
a tag reading device comprising:
an external interface communicatively coupled to the POS main body;
an RFID interface configured to read the tag information from an RFID tag; and
the buffer memory configured to sequentially record the tag information read from the RFID tag via the RFID interface, the buffer memory storing a transmission start pointer indicating tag information for starting transmission and a write pointer indicating a record area in which tag information is written, the tag reading device being configured to:
communicate the transmission start pointer indicating untransmitted tag information in the buffer memory;
update the transmission start pointer indicating untransmitted tag information in the buffer memory;
notify the POS main body of a buffer full error when the buffer memory becomes full; and
stop the reading of the RFID tags when the buffer full error is detected.

6. The POS system of claim 5, wherein the RFID tag is coupled to the commodity.

7. The POS system of claim 5, wherein the RFID tag is activated by radio waves.

8. The POS system of claim 5, wherein the POS main body is coupled to a barcode reader configured to read a barcode comprising the tag information specifying the commodity.

9. The POS system of claim 8, wherein the POS main body comprises an interface configured to couple at least one of the tag reading device, a keyboard, a display device, or the barcode reader.

10. A method of operating a tag reading device comprising:
transmitting a signal indicating a read command from a point of sale (POS) main body;
in response to receiving the read command, transmitting, by a radio frequency identification (RFID) tag, transmitting a response signal comprising tag information;
in response to receiving the response signal, determining whether the tag information is duplicate tag information;
in response to determining the tag information is not duplicate tag information, storing the tag information in a buffer memory, the buffer memory storing a transmission start pointer indicating tag information for starting transmission and a write pointer indicating a record area in which tag information is written;
transmitting the tag information accumulated in the buffer memory to the POS main body in response to a request from the POS main body;
updating the transmission start pointer indicating untransmitted tag information in the buffer memory;

notifying the POS main body of a buffer full error when the buffer memory becomes full; and stopping the reading of the RFID tags when the buffer full error is detected.

11. The method of claim 10, further comprising incrementing a record area indicated by the write pointer when the tag information is stored in the buffer memory.

12. The method of claim 10, further comprising transmitting the response signal indicating the tag information from the RFID tag, to a reception side amplifier via a directional coupler.

13. The method of claim 12, further comprising inputting the response signal amplified by the reception side amplifier to a demodulator, and demodulating the response signal indicating the tag information of the RFID tag.

14. The method of claim 10, further comprising receiving an input by an operator to a clear button.

15. The method of claim 14, further comprising, in response to receiving the input by the operator, clearing the tag information stored in the buffer memory.

* * * * *